March 17, 1959 J. C. DRADER 2,877,895
GEAR SELECTOR

Filed July 28, 1954 5 Sheets-Sheet 1

INVENTOR.
Joseph C. Drader
BY
Harness, Dickey & Pierce
ATTORNEYS

March 17, 1959

J. C. DRADER 2,877,895

GEAR SELECTOR

Filed July 28, 1954

INVENTOR.
Joseph C. Drader.
BY
Harness, Dickey & Pierce.
ATTORNEYS.

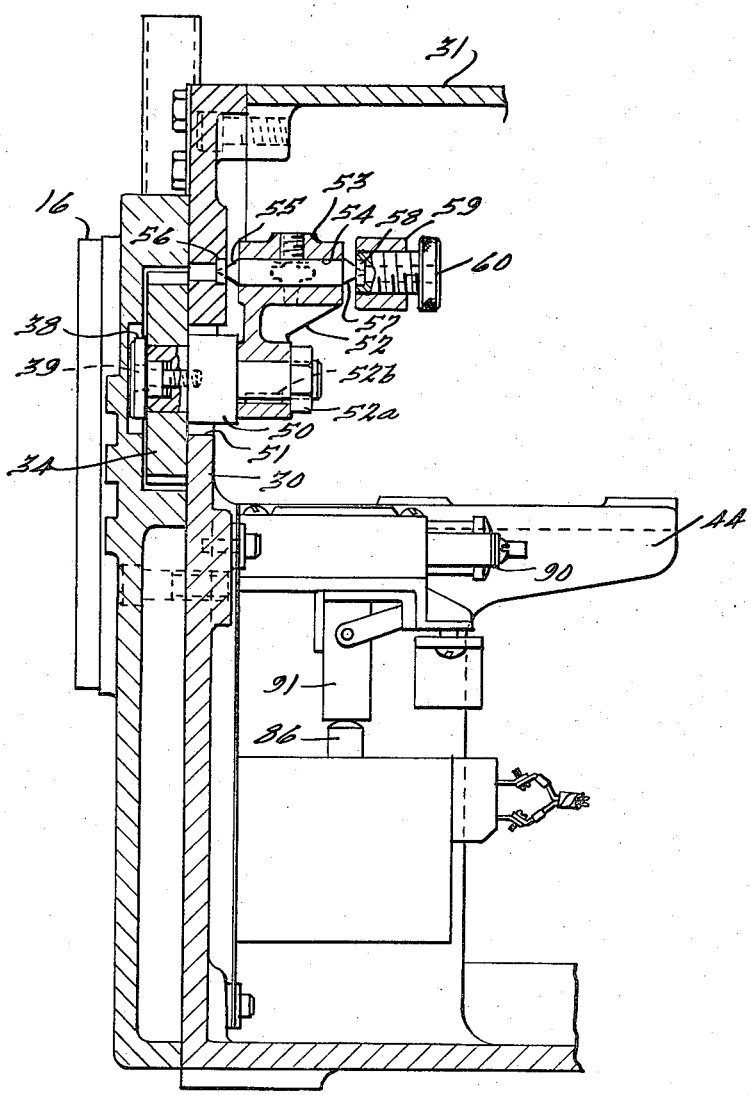

March 17, 1959
J. C. DRADER
2,877,895
GEAR SELECTOR
Filed July 28, 1954
5 Sheets-Sheet 5
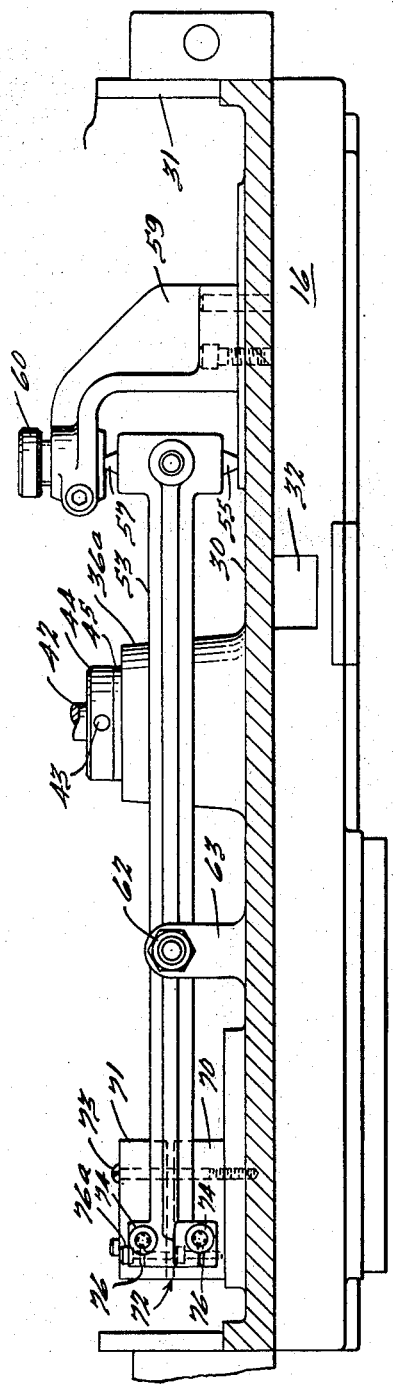
INVENTOR.
Joseph C. Drader
BY
Harness, Dickey & Pierce
ATTORNEYS

2,877,895
GEAR SELECTOR

Joseph C. Drader, Grosse Pointe Farms, Mich., assignor to Michigan Tool Company, Detroit, Mich., a corporation of Michigan Application July 28, 1954, Serial No. 446,238

16 Claims. (Cl. 209—88)

The present invention relates generally to the art of producing gears by cutting, grinding, and the like. More specifically, the present invention relates to the integration of a quality control device with gear-producing machines and gear-producing and gear-utilizing processes. Most specifically, the invention relates to a device for testing, selecting, and separating specification gears and undersize, oversize and otherwise imperfectly-dimensioned gears.

In the machine fabrication industries, especially in the automotive industry, great numbers of identical gears for transmissions, axle assemblies, and the like must be produced. Most of these gears must be made to extremely close tolerances to permit mass production assembly of the finished transmission, axle assembly, and the like, and also to ensure proper and dependable performance of the final automobile or other sub-assembly. Gears of these and other types are usually made on automatic gear-hobbing or gear-grinding machines which are capable of producing excellent gears at amazing speed. Due, however, to wear or breakage of cutting or grinding tools, or due to improper initial tool sharpening and/or machine setting, or other human error, these machines can also turn out a high percentage of imperfect products when not properly operated. Since to err is but human, there has existed for a long time a need for a means for quickly and efficiently inspecting and rejecting such imperfect products before they are assembled into complete machines or sub-assemblies. There has existed also a need for a means of detecting improper operation of automatic gear-producing machines before a substantial number of rejects have been produced.

It is a principal object of this invention, therefore, to provide a gear selector device for quickly and efficiently inspecting and grading gears as meeting specifications, or as undersize or oversize.

It also is an important object of this invention to provide a complete gear selector unit which may be attached to any type of automatic gear-producing machine, or used separately as such to inspect and grade a stock of gears at any intermediate stage of their production, or used as such to grade a stock of already finished but uninspected gears.

It also is a closely related object of this invention to provide a completely automatic gear inspecting or selecting device which not only selects those gears meeting specifications but which also separates gears as to undersize or oversize so that the oversize gears may be returned to the production lines for correction and reclaiming. Such a device is especially useful at an intermediate state or step in gear manufacture not only to prevent unnecessary expenditures of time and work on undersize gears, but also to separate out or return overisze gears for resizing or reprocessing.

Still another important object of this invention is to provide a gear selector device which is susceptible for use as a quality control mechanism at any stage of gear manufacture or utilization subsequent to the cutting of the teeth and which will (1) shut down a gear-producing, gear-finishing or gear-utilizing machine or machines when the percentage of imperfect gears in the total output is above a pre-selected economical level and (2) which will function as an emergency shut-down device when reject gears are produced in consecutive succession indicating tool failure or improper adjustment of the gear-producing machine.

Another object is to provide a gear selector device which will indicate at a glance the state of operation of automatic gear-producing machine.

Still other objects and advantages will be apparent, or will become apparent, in the detailed description of the invention to follow when taken in conjunction with the accompanying drawings, in which:

Fig. 4 is a transverse view in section of the gear-selecting device of Figs. 1 to 3, the section being taken along the line 4—4 of Fig. 2;

Fig. 5 is a plan view partially in section, and with portions broken away, the view being taken in the direction of the arrow 5 in Fig. 2;

Fig. 6 is a diagrammatic representation of a simplified circuit for the gear selecting device of Figs. 1 to 5 arranged simply to grade and separate gears as oversize, undersize or correct size; and Fig. 7 is a complete wiring diagram of a controls circuit for the gear-selecting device of Figs. 1 to 5, incorporating both (1) an integrating quality control circuit arranged to shut down a gear-producing or gear-using device with which the gear selector is coupled when the percentage of imperfect gears is above a pre-selected economical level and (2) an emergency consecutive reject shut-down circuit.

Figure 1:
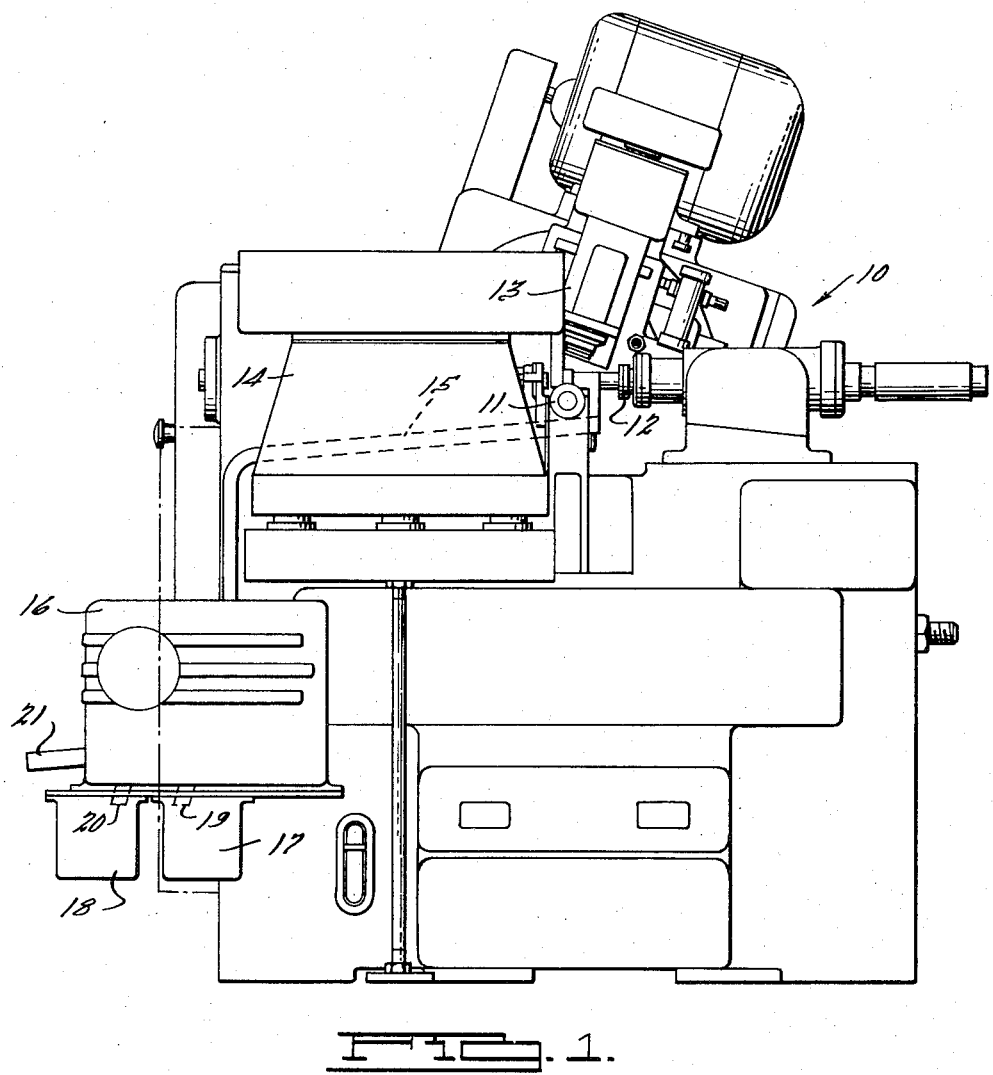
Figure 1 is a front elevational view showing an automatic gear-hobbing machine with the gear-selecting device of this invention installed thereon.

In accordance with the present invention, the gear selector of this invention, and by the latter term is meant a device which measures and separates gears which meet specifications and those which are oversize or undersize, is mounted on an automatic gear-hobbing machine indicated generally by the numeral 10, of the type which automatically accepts a continuous stream of gear blanks or blank castings 11, mounts them on an arbor or spindle 12 and cuts teeth into them by means of a cutting tool or grinding fixture mounted in a tool head mechanism indicated generally by the numeral 13. Attached to the front of the gear-hobber 10 is a vibratory parts feeder 14 of the type known as "Syntron" which feeds gear blanks up a vibrating passageway. From the hobbing spindle the gears, now possessing cut teeth, pass down a downwardly inclined, tube-like passageway 15 to the gear selector device of this invention, shown in Fig. 1 enclosed in a housing 16 and having beneath it a pair of removable baskets or hoppers 17, 18 the former for receiving undersize gears exiting from the selector through undersize reject chute 19 and the basket 18 for oversize gears exiting through oversize reject chute 20. Gears meeting size specifications (and at this point only the outer diameter, inner or root diameter, and gear profile have been inspected and the gears graded accordingly) continue their passage down a passageway 32 and leave the gear selector by means of opening 21. Thus, Fig. 1 shows a completely automatic gear-hobbing unit incorporating a gear blank feeder, a gear cutting machine and a gear inspecting and selecting device of this invention. The freshly cut gears leaving the gear selector through opening 21 may be conducted to a hopper or storage receptacle or conducted directly to another parts feeding device feeding a machine performing any of the gear finishing operations such as grinding, polishing and/or heat treating.

Figure 2:
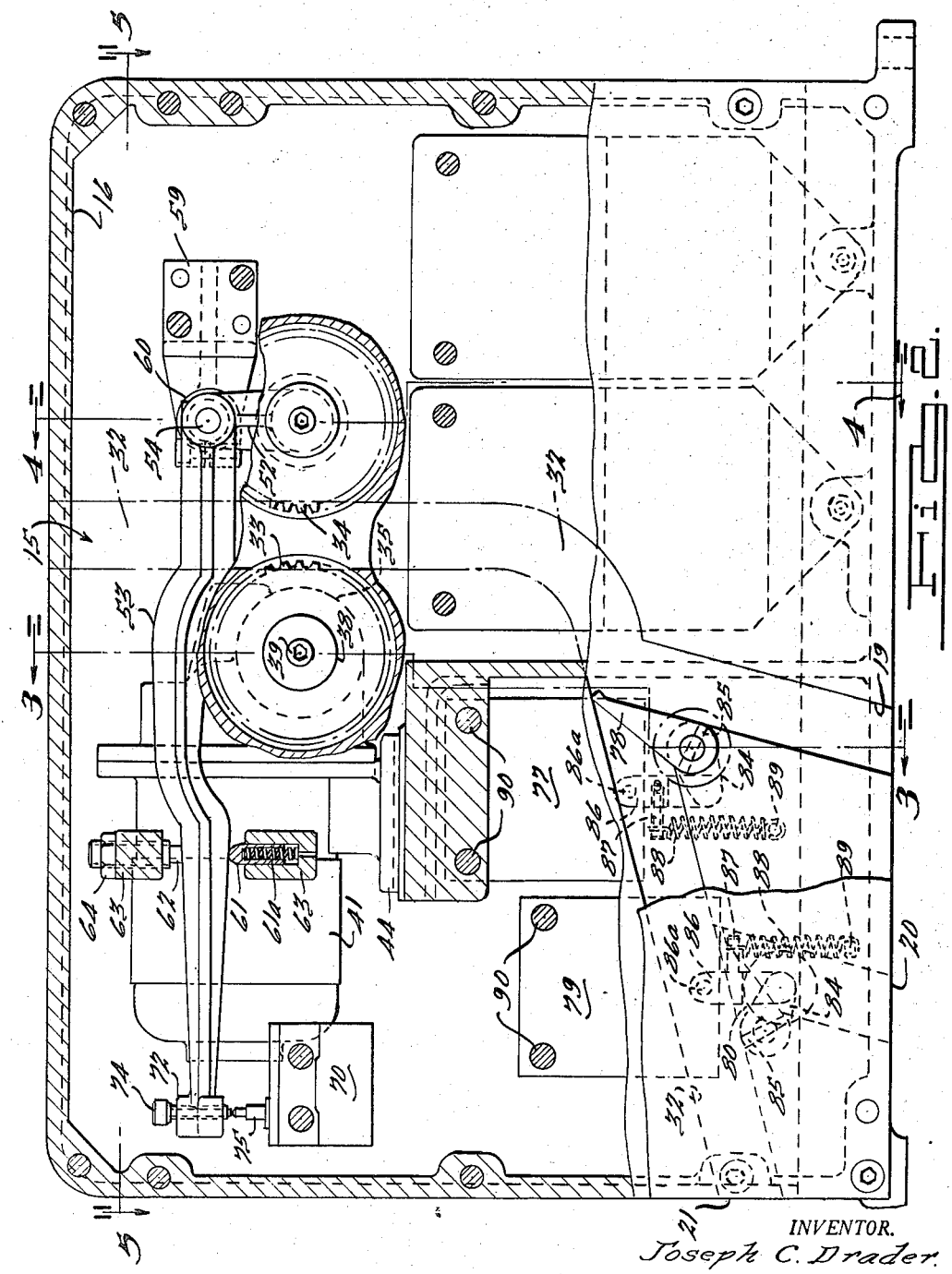
Fig. 2 is a front elevational view, with the outer case broken away and with portions in section, of the gear selecting device of this invention.

The gear selector device of this invention is shown in greater detail in Fig. 2, with the front of the outer case 16 broken away to show the internal mechanism. In the sectional views of Figs. 3 and 4, it will be seen that the outer or front case 16 is bolted to a central vertical, right angular frame member 30. On the back of the latter frame member 30, there is bolted a louvered back cover or case 31. The freshly-cut gears enter the top of the gear selector device in the direction of the arrow 15 and drop downwardly through a passageway 32 in front cover 16 until they come in contact with a pair of master gears 33, 34, the former being a fixed gear adapted for power-driven rotation and the latter being fixed against rotation but adapted for pivotal movement away from the power-driven master gear 33. If desired, the master gears may be arranged in more or less horizontal or inclined positions with a conveyor belt or similar device being employed to move sample gears through the master gears to the reject chutes.

The power-driven master gear 33 is mounted on the left-hand side (as viewed in Fig. 2) by means of a short drive shaft 35 (see Fig. 3) journalled in a bearing 36 contained in a housing 36a formed as an integral part of the main frame member 30. The driven master gear 33 is keyed to the small projecting end 37 of shaft 35 and a cap 38 and bolt 39 provided for secure fastening. A thrust washer 40 is provided between the face of gear 33 and bearing 36 to insure free rotation. The shaft 35 is connected to a gear-reducer motor combination 41 by means of a coupling pin 42 and set screw 43 mounted in a collar 44. As shown, a thrust pad or washer 45 is provided to insure smooth running. The gear drive motor combination 41 is mounted on a horizontal bracket arm 46 which also is an integral part of the main frame member 30.

The non-rotating, movable master gear 34 is pivotally mounted (see Figs. 2 and 4) on a short adapter shaft 50 extending through a slotted horizontal opening 51 in frame member 30. A collar 38 and bolt 39 is provided as in the case of gear 33 to lock the gear to shaft 50. The adapter shaft 50 is keyed onto a bracket 52 formed as an integral part of a deflector arm 53, a nut 52a and key 52b being provided to insure against relative movement between bracket 52 and adapter 50. The arm 53 is pinned to a pivot rod 54 which has one tapered end 55 nested in a conical bearing 56 in frame member 30 and its other tapered end 57 nested in an adjustable bearing 58 supported in an outwardly-extending bracket arm 59 (in Fig. 5) attached to frame-member 30. The bearing 58 has a knurled end-thrust screw 60 for end-wise adjustment of the pivot rod 54. Thus mounted, the arm 53 can be aligned and adjusted to move very freely or its movement can be damped by tightening or adjusting screw 60. In most cases, it is desirable that arm 53 not oscillate freely in response to vibration but rather move only in response to the passage of a sample gear between the master gears 33, 34.

The distance of upward and downward movement of the left-hand end 72 of arm 53 is adjustably controlled (see Figs. 2 and 5) by a lower spring-loaded stop 61 and an upper adjustable stop 62 located in small, outwardly-projecting brackets 63, 63 integral with frame member 30. The lower stop 61 has a compression spring 61a so as to always be in contact with the underside of arm 53. The upper stop 62 is an adjustable screw having a lock nut 64. Up-and-down movement of screw stop 62 positions the arm 53, and thereby the movable master gear 34, at about the approximate median or neutral position within the range of specification tolerances. The spring-loaded bottom stop 61 also serves to return the arm 53 to the neutral position after passage of a sample gear between master gears 33, 34. It is preferable that the two master gears 33, 34 be maintained in spaced-apart relation at about the median specification root diameter in order to prevent jamming or faulty engagement of sample gears. If the master gears are positioned at a distance substantially less than the median specification root diameter, a sample gear might jam therebetween and cause damage to the master gears, the pivot arm and the drive mechanism. If positioned at substantially more than median specification, root diameter, an undersize sample gear might pass through without properly actuating arm 53. More importantly, it is necessary to position arm 53 and limit its pivotal arc in order to be able to correctly position a number of microswitches which actuate the selector mechanism.

The arm 53 transmits the pivotal movement of the movable master gear 34 to a pair of microswitches 70, 71 mounted beneath the left-hand end 72 thereof (as seen in Figs. 2 and 5). The switches 70, 71 are shown enclosed in boxes and fastened in side-by-side relationship to the frame member 30 by means of a long stud bolt 73. As will be seen most clearly in Figs. 2 and 5, the end 72 of arm 53 is T-shaped with two adjustable screws 74, 74 tapped vertically therethrough in such a position to engage the upstanding plungers 75, 75 of microswitches 70, 71. The screws 74, 74 can be advanced or withdrawn in order to properly actuate the microswitch mechanism at a proper point in the arc of pivotal movement of arm 53. To lock the adjusting screws 74, 74 in position, the T-shaped arm end 72 is provided with longitudinal slots 76, 76 and a transverse lock bolt 76a extended through the slots for applying a clamping pressure.

Each of microswitches 70, 71 are connected to a solenoid gate-operating mechanism disposed in the passageway 32, microswitch 70 being connected to solenoid 77 attached to a deflector gate 78 located in the passageway 32 at its junction with undersize reject passageway or chute 19 and microswitch 71 being connected to a solenoid 79 attached to a deflector gate 80 located at the juncture of passageway 32 with oversize reject chute 20. Microswitches 70, 71 and adjusting screws 74, 74 are so positioned that sample gears passing through the master gears 33, 34 will correctly operate the deflector gates 78, 80 to direct the gear to the proper discharge chute or exit opening. With the control circuits of Figs. 6 and 7, deflector gate 78 is a normally-open gate which closes off undersize reject chute 19 when a sample gear is correct size or oversize and deflector gate 80 is a normally-closed gate which maintains oversize reject chute 20 closed until solenoid 79 is energized to open it. Thus, microswitch 70 is arranged to be closed by its plunger 75 to energize solenoid 77 when the sample gear is correct size or oversize. When, however, the sample gear is undersize, the already open gate 78 automatically deflects it into undersize reject chute 19. Microswitch 71, however, is closed by arm 53 only when the sample gear is oversize, thus energizing solenoid 79 to open gate 80. With this arrangement of switches and solenoids, there need not be a delicately-balanced neutral position for correct-sized gears. If desired, the microswitches can be arranged to operate a multiple directional deflector arm disposed at a juncture of several reject chutes.

Figure 3:
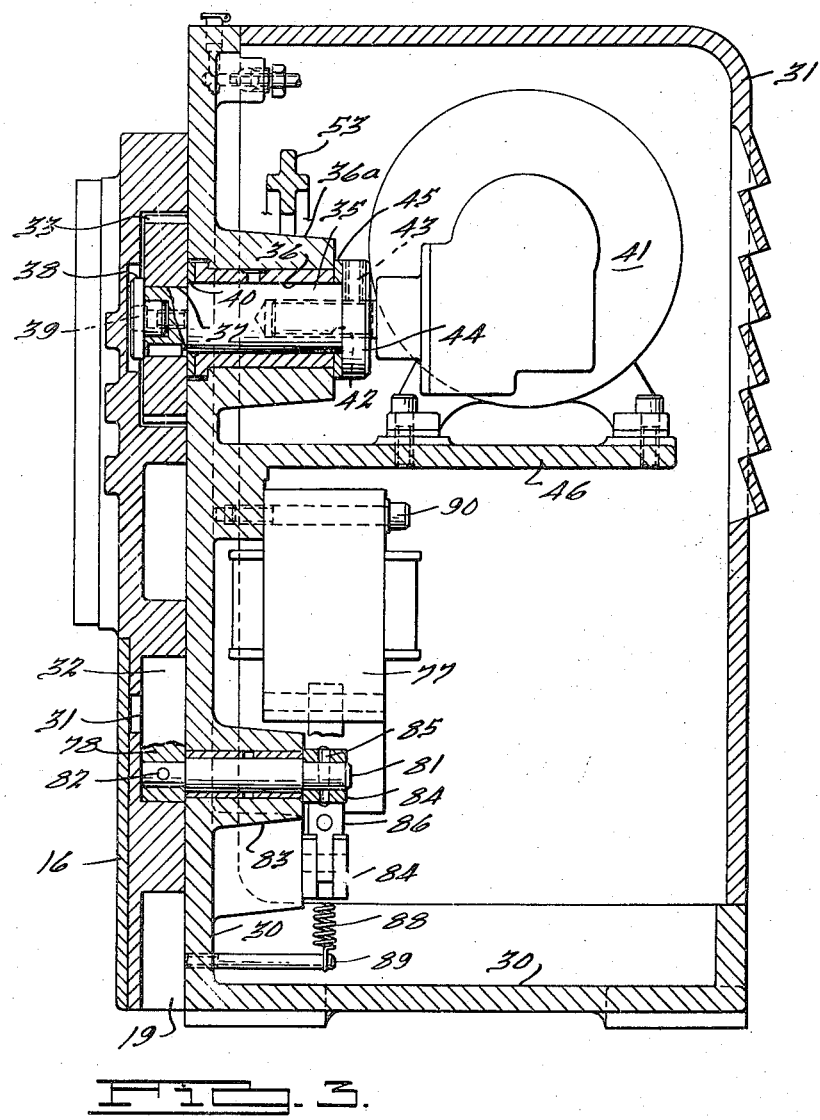
Fig. 3 is a transverse view in section of the gear-selecting device of Figs. 1 and 2, the section being taken along the line 3—3 of Fig. 2.

The deflector gates 78, 80 are each pinned to deflector shaft 81 (see Fig. 3) by means of a taper pin 82, the shaft 81 being journalled in a bearing housing 83 integrally formed in main frame member 30 (see Fig. 3). On their inner ends shafts 81, 81 have a connecting arm member 84 pinned thereto by means of a taper pin 85. The connecting arm 84 associated with gate 78 is pivotally connected on its other end to a link 86 which is pivoted on a pin 86a attached to the outer casing of solenoid 77. From the side of link 86, a small screw-threaded pin 87 extends outwardly to serve as an anchor for an extension spring 88. The lower end of spring 88 is secured to a small pin 89 tapped into the frame member 30. Thus arranged, the spring 88 returns gate 78 to the open position when solenoid 77 is deenergized either by return of arm 53 to its usual position determined by stops 61, 62 or by engagement of the next succeeding sample gear between the master gears 33, 34. The linkage system for deflector gate 80 is similar except that it is reversed so that the spring 88 serves to return gate 80 to the closed position when solenoid 79 is deenergized.

As will be seen in Figs. 2 and 3, the solenoids 77 and 79 are each attached to the main vertical frame member 30 by means of two stud bolts 90, 90. The deflector shafts 81, 81 are rotated by the movement of the solenoid plungers 91, 91. When the links 86, 86 are moved upwardly, the gates 78, 80 are pivoted into closed and open positions, respectively, and vice versa. It is to be understood that it is within the contemplation of the present invention to provide more than two microswitches, solenoids, deflector arms, and rejection chutes in order to permit a closer grading and separation of sample gears into more than one undersize or oversize classification.

Because of the quality control and emergency consecutive reject shut-down features of the circuit shown in Fig. 7, a third limit microswitch having normally closed contacts LS3A and normally open contacts LS3B shown in Fig. 7, is located in the undersize reject chute 19 to actuate the counter coils of several electrical counters. This limit switch is not shown since its position is somewhat determined by the size and type of gear being tested in the apparatus.

In Figs. 6 and 7, there are shown diagrams of two illustrative controls systems which have been used in connection with the gear selector device of Figs. 1 through 5. The control system of Fig. 6 is a simple automatic control system for controlling and operating the basic operation of the gear selector of Figs. 1 to 5 while that of Fig. 7 includes the elements of Fig. 6 and, in addition, incorporates (1) an integrating quality control system for shutting down a gear-producing machine or machines when the ratio of total rejected gears to total gears produced is too high and (2) an emergency consecutive reject shut-down control to shut down the gear-producing machine or machines when a given number of imperfect gears are produced in consecutive succession (thereby indicating a failure of the cutting, grinding or polishing tool or other machine failure).

In the system of Fig. 6, there is provided solenoid 77 which, when energized, operates deflector gate 78 to close off the undersize reject chute 19 and solenoid 79 which, when energized, operates to raise the deflector gate 80 and open up oversize chute 20. The numeral 70 is attached to the symbol for a microswitch operated by the switch arm 53 when a sample gear is correct size and the numeral 71 is attached to the symbol for a similar microswitch operated by switch arm 53 when the sample gear is oversize. Microswitch 70 is connected to a timing relay TR1, the latter being set to maintain solenoid 77 energized until the correct-sized sample gear rolls past undersize chute 19. When timer TR1 times out, it de-energizes solenoid 77 and undersize chute 19 is reopened by spring 88. Microswitch 71 is connected to timing relay TR2, the latter maintaining solenoid 79 energized to hold deflector gate 80 open until an oversize gear drops into the oversize chute 20. Thus, an undersize sample gear does not cause arm 53 to operate any of the microswitches, a correctly-sized sample gear causes arm 53 to operate microswitch 70 and an oversize sample gear causes arm 53 to operate microswitch 71. As stated above, deflector gate 78 is a normally-open gate requiring energization of solenoid 77 to be closed while deflector gate 80 is normally closed requiring energization of solenoid 79 to be opened.

The system of Fig. 6 also incorporates gear motor 41 and its starter represented by capacitor symbols 100, 100a, 100b and 100c. Motor 41 is protected by a thermal relay 101 and the entire control circuit by a fuse block 102. The entire system is placed in operation by plugging plug 103 into a conventional grounded 110 volt 60 cycle line.

In Fig. 7, another embodiment of the invention is illustrated to achieve quality control and emergency shutdown in the event a predetermined number of workpieces are rejected consecutively. As shown in Fig. 7, the portion of the circuit surrounded by dotted lines is enclosed in a control panel or box separate from the gear selector case. The solenoids 77 and 79 are included in this circuit and perform the functions previously described. In this circuit, LS1 is a conventional microswitch having normally open contacts which are closed when a correct size or oversize gear workpiece engages the contact actuator as the gear moves past the microswitch, such contacts reopening when the gear disengages from the contact actuator as it moves beyond the limit switch. LS2 is a conventional microswitch having normally open contacts which are closed when an oversize gear workpiece engages the contact actuator as the gear moves past the microswitch, such contacts reopening when the gear disengages from the contact actuator as it moves beyond the microswitch. The previously mentioned normally closed contacts LS3A are opened and the normally open contacts LS3B are closed when an undersize gear passes through the undersize reject chute 19, the contacts LS3A closing again and the contacts LS3B reopening when the undersize gear disengages from the contact actuator as the gear moves beyond the limit switch. TR3 is a timing relay similar to TR1 of Fig. 6 in that it maintains solenoid 77 energized until a correctly-sized or oversize sample gear rolls past the undersize chute 19. TR4 is another timing relay which is similar in function to TR2 of Fig. 6 in that it maintains solenoid 79 energized (and deflector gate 80 open) until an oversize gear has dropped into oversize reject chute 20. TR5 is a timing relay which operates to reset counter T3 when a correct size gear passes through the master gears. Finally, relay CR is the control relay arranged to control or actuate an auxiliary circuit separate and distinct from the gear selector circuit. For the purposes of illustration, control relay CR is assumed to be connected to the motor circuit of a gear-producing machine.

In Fig. 7, T1 is an electric totalizing counter which counts all sample gears passing through the master gears. The latter counter is set for any given total number of gears to be produced, for example, in a given interval of time. T2 is a second electric counter which counts the number of undersize and oversize reject gears passing through the master gears. Counters T1 and T2 are so integrated that if T2 counts out before T1, the control relay CR is de-energized shutting down the gear-producing machine. In Fig. 7, T3 is a third electric counter which counts the number of consecutively rejected undersize and/or oversize gears passing through the master gears. The count coil T3-1 of counter T3 is energized every time a reject occurs. If counter T3 counts out before an acceptable sample gear passes through, the control relay CR is de-energized and the gear-producing machine will again be shut down. If, however, an acceptable sample gear passes through the master gears before counter T3 counts out the timing relay, the contacts TR3A of the relay TR3 maintain the energization of relay TR5 which operates to reset counter T3, as mentioned above. In the diagram of Fig. 7, counters T1, T2 and T3 have count coils T1–1, T2–1 and T3–1 and clutch coils T1–2, T2–2, and T3–2. The functions of these various coils will be explained below in connection with the operation of the quality control and emergency consecutive reject shut-down circuits. The counters T1, T2, and T3 are conventional counters which are commercially available and of the type that are actuated upon the make and break of the electrical circuits associated therewith.

The entire circuit of Fig. 7 is energized by plugging in a plug 110 to a conventional grounded 110 volt 60 cycle receptacle and then pressing re-set button 111. The latter energizes the main control relay CR, and the normally closed contacts CR4 open to extinguish the red warning light "R," and the gear selector circuit is fully energized by closure of the contacts CRB of the relay CR. Relay CR also has a set of contacts (not shown) which complete the circuit to the motor or motors of the gear-producing machine. The latter then may be started and the production of gears commenced. As explained more fully hereinabove, each gear produced drops down into contact with the master gears 33, 34. Disengagement of LS1 by a correct or oversize gear energizes timing relay TR3 which in turn energizes solenoid 77 through closure of the contacts TR3A to close deflector gate 78 for a period of time necessary for the gear to roll past undersize reject chute 19. Disengagement of LS2 by oversize gears energizes timing relay TR4 which maintains energization of solenoid 79 through the closure of contacts TR4A until the gear has dropped into oversize reject chute 20. Opening of the contacts LS3A of the limit switch LS3 by an undersize gear in the undersize reject chute 19 causes de-energization of count coil T1–1. The latter count coil also is de-energized by timing relay TR3 through the opening of contacts TR3B when correct-sized or oversized gears pass through, thus counting all gears being produced. Count coil T2–1 of the reject counter T2 is energized both by an undersize gear closing the contacts LS3B of the limit switch LS3 in the undersize reject chute 19 and by closure of the contacts TR4C of the relay TR4 when an oversize gear engages LS2, since the latter energizes the relay TR4. Thus, all reject gears are counted. Count coil T3–1 of the consecutive reject counter T3 is energized, each time a reject occurs, either by LS2 or LS3. If an intervening acceptable gear passes through the master gears before T3 counts out, the contacts TR3A of the timing relay TR3 maintain energization of timing relay TR5 which in turn operates to reset counter T3. The latter starts counting all over again until reset by passage of an acceptable gear or until it counts out de-energizing the main control relay CR and shutting down the gear-producing machine, the gear selector itself and lighting the red warning light "R" to indicate that the machine was shut down by the gear selector and not by power failure, a blown fuse, or some other cause not connected with gear quality.

What is claimed is:

1. A device for testing, selecting, and separating undersize and oversize gears which comprises a pair of toothed master gears, one of said gears being fixed in position and power driven and the other being fixed against rotation and movably-mounted in spaced-apart relation with said driven gear, and at a distance therefrom corresponding approximately with specification dimensions, for movement away from the said fixed rotatable gear, pivotally mounted lever means connected to said movably-mounted gear and arranged to be pivoted by movement thereof, electrical contact means associated with said lever means and aranged to be operated by pivotable movements thereof, electrically-operated selector means connected to each said electrical contact means for entrapping gears according to the movement of said lever means, and means for guiding gears to be tested between said gears and into simultaneous intermeshing engagement therewith.

2. A device for testing, selecting and separating undersize, oversize and specification gears which comprises a passageway adapted to contain freely rolling gears, a pair of spaced-apart master gears located in said passageway so that sample gears moving in said passageway must pass therebetween and simultaneously intermesh with both said master gears, one of said master gears being fixedly mounted for power driven rotation and the other of said gears being movably mounted so as to be displaceable only in a direction away from said driven master gear, a pivotally-mounted lever arm connected to said movably-mounted master gear and arranged to be pivoted by movements thereof, electrical switches mounted adjacent said lever arm and arranged to be operated by pivotable movements thereof, and electrically-operated gate means electrically connected with said electrical switches and disposed at different positions in said passageway below said master gears so as to remove undersize, oversize and specification gears at different positions therein.

3. A gear selecting device as claimed in claim 2 and further characterized in that there are at least two said gate means for trapping and removing undersize and oversize sample gears and one of said electrical switches is arranged to be disengaged by said switch arm when correctly-sized and oversized sample gears pass between the said master gears thereby to close one of said gates and the other of said electrical switches is arranged to be disengaged when said sample gear is overize thereby to open another of said gates.

4. A gear-selecting device comprising a housing, a passageway means extending through said housing, at least a pair of toothed master gears mounted in spaced-apart relation, respectively, on either side of said passageway means so that sample gears moving therethrough must pass between said master gears and simultaneously intermesh therewith, one of said master gears being fixedly mounted and arranged for power-driven rotation and the other of said master gears being fixed against rotation and mounted for pivotal movement away from said power-driven master gear, a pivotally-mounted lever arm connected to said pivotally-mounted master gear and arranged to respond to movements of the latter caused by the passage of sample gears moving through said master gears, and means associated with said passageway means for separately collecting and rejecting undersize, oversize and correctly-sized sample gears out through said housing, the last-named collecting and rejecting means being arranged to respond for each gear passing through said device to the degree of movement imparted thereby to said lever arm.

5. Apparatus for gauging gear workpieces and the like comprising, in combination, a movable gauge element adapted to engage with the teeth of a gear workpiece, means spaced from said element and cooperating with said element to support, one at a time, all gear workpieces being tested and acting as a fixed reference for all gear workpieces being tested and means responsive to the movement of said element when a gear workpiece moves between said element and said fixed reference means and therebeyond for separating said gear workpieces as a function of the movement of said element.

6. Apparatus for gauging gear workpieces and the like comprising, in combination, a movable gauge element adapted to engage with the flanks of the teeth of a gear workpiece, means spaced from said element and cooperating with said element to support, one at a time, all gear workpieces being tested and acting as a fixed reference for all gear workpieces being tested and means responsive to the movement of said element when a gear workpiece moves between said element and said fixed reference means and therebeyond for separating said gear workpieces as a function of the movement of said element.

7. Apparatus for gauging gear workpieces and the like comprising, in combination, a movable gauge element adapted to engage with the teeth of a gear workpiece, means spaced from said element and cooperating with said element to support, one at a time, all gear workpieces being tested and acting as a fixed reference for all gear workpieces being tested, means including switch means responsive to the movement of said element when a gear workpiece moves between said element and said fixed reference means and therebeyond, and means actuated by said switch means for separating said gear workpieces as a function of the movement of said element.

8. Apparatus for gauging gear workpieces and the like comprising, in combination, a movable gauge element including tooth means adapted to engage with the teeth of a gear workpiece, means spaced from said element and cooperating with said element to support, one at a time, all gear workpieces being tested and acting as a fixed reference for all gear workpieces being tested, actuating means responsive to the movement of said element when a gear workpiece moves between said element and said fixed reference means and therebeyond, and means controlled by said actuating means for separating said gear workpieces as a function of the movement of said element.

9. Apparatus for gauging gear workpieces and the like comprising, in combination, a movable gauge element adapted to engage with the teeth of a gear workpiece, a fixed gauge element spaced from said movable element and cooperating with said movable element to support, one at a time, all gear workpieces being tested and acting as a fixed reference for all gear workpieces being tested and means responsive to the movement of said movable element when a gear workpiece moves between said movable element and said fixed gauge element and therebeyond for separating gear workpieces as a function of the movement of said movable element.

10. Apparatus for gauging and separating gear workpieces and the like comprising, in combination, a movable element adapted to project into the interdental space between the teeth of a gear workpiece, means spaced from said element and cooperating with said element to support, one at a time, all gear workpieces being tested and acting as a fixed reference for all gear workpieces being tested and means responsive to the movement of said element when a gear workpiece moves between said element and said fixed reference means and therebeyond for separating gear workpieces as a function of the movement of said element.

11. Apparatus for gauging and separating gear workpieces comprising, in combination, a movable element adapted to project into the interdental space between and engage the teeth of a gear workpiece, means spaced from said element and cooperating with said element to support, one at a time, all gear workpieces being tested and acting as a fixed reference for all gear workpieces being tested, actuating means responsive to the movement of said element when a gear workpiece moves between said element and said fixed reference means and therebeyond, and control means actuated by said actuating means for separating said gear workpieces as a function of the movement of said element.

12. Apparatus for gauging and separating gear workpieces comprising, in combination, a movable gauge element adapted to project into the interdental space between and engage the teeth of a gear workpiece, means spaced from said element and cooperating with said element to support, one at a time, all gear workpieces being tested and acting as a fixed reference for all gear workpieces being tested, electrical switch means responsive to the movement of said element when a gear workpiece moves between said element and said fixed reference means and therebeyond, electro-responsive control means actuated by said switch means for separating said gear workpieces as a function of the movement of said element, and additional control means actuated by said switch means for controlling a gear producing machine.

13. In combination with a gear producing machine, apparatus for testing gear workpieces currently being produced by said machine and for controlling the operation of said machine, including a movable gauge element adapted to engage with the teeth of a gear workpiece produced by said machine, means for moving gear workpieces from said machine and presenting the gear workpieces to said gauge element, means spaced from said element and cooperating with said element to support, one at a time, all gear workpieces being tested and acting as a fixed reference for all gear workpieces being tested, and means responsive to the movement of said element when a gear workpiece moves between said element and said fixed reference means and therebeyond for controlling an electrical circuit of said machine as a function of the movement of said element.

14. In combination with a gear producing machine, apparatus for testing gear workpieces currently being produced by said machine and for controlling the operation of said machine, including a movable gauge element adapted to mesh with the flanks of the teeth of a gear workpiece, means for moving gear workpieces from said machine and presenting the gear workpieces to said gauge element, means spaced from said element and cooperating with said element to support, one at a time, all gear workpieces being tested and acting as a fixed reference for all gear workpieces being tested, counting means responsive to the movement of said element when a gear workpiece moves between said element and said fixed reference means and therebeyond for counting the number of workpieces each having a dimension within a finite range, and means actuable by said counting means counting a predetermined sequential count for controlling an electrical circuit of said machine.

15. In combination with a gear producing machine having an electrical control circuit, means for controlling said circuit including a movable gauge element adapted to engage with the teeth of a gear workpiece currently being produced by said machine, means for moving gear workpieces from said machine and presenting the gear workpieces to said gauge element, means spaced from said element and cooperating with said element to support, one at a time, all gear workpieces being tested and acting as a fixed reference for all gear workpieces being tested, electrical counting means responsive to the movement of said element when a gear workpiece moves between said element and said fixed reference means and therebeyond for counting the number of workpieces each having a dimension within a finite range, and means controlled by said counting means counting a predetermined sequential count for controlling the energization of said circuit.

16. In combination with a gear producing machine having an electrical control circuit, means for controlling the energization of said circuit including a movable element adapted to project into the interdental space between and engage the teeth of a gear workpiece currently being produced by said machine, means for moving gear workpieces from said machine and presenting the gear workpieces to said gauge element, means spaced from said element and cooperating with said element to support, one at a time, all gear workpieces being tested and acting as a fixed reference for all gear workpieces being tested, electrical switch means responsive to the movement of said element when a gear workpiece moves between said element and said fixed reference means and therebeyond, counting means controlled by said switch means for counting the number of workpieces each having a dimension within a finite range, electro responsive control means actuated by said switch means for separating said gear workpieces as a function of the movement of said element, and means controlled by said counting means counting a predetermined sequential count for controlling the energization of said circuit.

References Cited in the file of this patent

UNITED STATES PATENTS

| | | |
|---|---|---|
| 1,830,756 | Ford | Nov. 10, 1931 |
| 2,318,970 | Richmond | May 11, 1943 |
| 2,338,868 | Owens | Jan. 11, 1944 |
| 2,393,614 | Curtis | Jan. 29, 1946 |
| 2,407,062 | Darrah | Sept. 3, 1946 |
| 2,542,090 | Lorenz | Feb. 20, 1951 |
| 2,664,557 | Sargrove | Dec. 29, 1953 |
| 2,712,408 | Weber | July 5, 1955 |
| 2,761,560 | Pomernacki | Sept. 4, 1956 |
| 2,815,579 | Bassoff | Dec. 10, 1957 |

OTHER REFERENCES

Gages, Gaging, and Inspection, Douglas T. Hamilton, 1918, The Industrial Press, pages 265–267.

Unusual Gaging Devices and Methods, "Machinery," July 1925, pages 888–890. (Copy in 33–179.52.)

"Versatility Accentuated in Continuous Gear Production," by C. E. Scott, "Automation," April 1955, pp. 47–53.

"Continuous Blank Machining in Gear Production," by J. J. McCabe, "Automation," June 1955, pp. 26–29.